(12) United States Patent
Heinla et al.

(10) Patent No.: US 10,732,641 B2
(45) Date of Patent: Aug. 4, 2020

(54) MOBILE ROBOT SYSTEM AND METHOD FOR GENERATING MAP DATA USING STRAIGHT LINES EXTRACTED FROM VISUAL IMAGES

(71) Applicant: Starship Technologies OÜ, Tallinn (EE)

(72) Inventors: Ahti Heinla, Tallinn (EE); Kalle-Rasmus Volkov, Tallinn (EE); Lindsay Roberts, Tallinn (EE); Indrek Mandre, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 0 days.

(21) Appl. No.: 15/968,802

(22) Filed: May 2, 2018

(65) Prior Publication Data
US 2018/0253108 A1   Sep. 6, 2018

Related U.S. Application Data

(63) Continuation of application No. PCT/EP2016/076466, filed on Nov. 2, 2016.

(30) Foreign Application Priority Data

Nov. 2, 2015 (EP) ..................................... 15192649

(51) Int. Cl.
*G05D 1/02* (2020.01)
*G06T 7/579* (2017.01)
(Continued)

(52) U.S. Cl.
CPC .......... *G05D 1/0246* (2013.01); *G01C 21/32* (2013.01); *G05D 1/0088* (2013.01);
(Continued)

(58) Field of Classification Search
CPC .. G05D 1/0274; G05D 1/0212; G05D 1/0088; G05D 1/0251; G05D 2201/0216;
(Continued)

(56) References Cited

U.S. PATENT DOCUMENTS

| 7,015,831 B2 | 3/2006 | Karlsson et al. |
| 7,873,448 B2 | 1/2011 | Takeda et al. |

(Continued)

FOREIGN PATENT DOCUMENTS

WO    WO 99/30270    6/1999

OTHER PUBLICATIONS

Gaspar et al., "Vision-based Navigation and Environmental Representations with an Omni-directional Camera," IEEE Transactions on Robotics and Automation (Dec. 2000) vol. 16, No. 6, pp. 890-898.
(Continued)

*Primary Examiner* — Muhammad Shafi

(57) ABSTRACT

A mobile robot is configured to navigate on a sidewalk and deliver a delivery to a predetermined location. The robot has a body and an enclosed space within the body for storing the delivery during transit. At least two cameras are mounted on the robot body and are adapted to take visual images of an operating area. A processing component is adapted to extract straight lines from the visual images taken by the cameras and generate map data based at least partially on the images. A communication component is adapted to send and receive image and/or map data. A mapping system includes at least two such mobile robots, with the communication component of each robot adapted to send and receive image data and/or map data to the other robot. A method involves operating such a mobile robot in an area of interest in which deliveries are to be made.

28 Claims, 7 Drawing Sheets

(51) Int. Cl.
  *G06T 7/73*    (2017.01)
  *G06T 7/00*    (2017.01)
  *G01C 21/32*   (2006.01)
  *G05D 1/00*    (2006.01)
  *G06Q 10/08*   (2012.01)

(52) U.S. Cl.
  CPC ......... *G05D 1/0212* (2013.01); *G05D 1/0223* (2013.01); *G05D 1/0251* (2013.01); *G05D 1/0274* (2013.01); *G06Q 10/0833* (2013.01); *G06T 7/579* (2017.01); *G06T 7/73* (2017.01); *G06T 7/97* (2017.01); *G05D 1/024* (2013.01); *G05D 1/027* (2013.01); *G05D 1/0255* (2013.01); *G05D 1/0272* (2013.01); *G05D 1/0278* (2013.01); *G05D 2201/0213* (2013.01); *G05D 2201/0216* (2013.01); *G06T 2207/10004* (2013.01); *G06T 2207/10016* (2013.01); *G06T 2207/20212* (2013.01); *G06T 2207/30244* (2013.01); *G06T 2207/30252* (2013.01)

(58) Field of Classification Search
  CPC ............... G06Q 10/0833; G01C 21/32; G06T 2207/10004; G06T 7/73; G06T 7/97; G06T 2207/20212
  USPC .......................................................... 701/25
  See application file for complete search history.

(56) References Cited

U.S. PATENT DOCUMENTS

| | | | |
|---|---|---|---|
| 8,305,430 B2 | 11/2012 | Oskiper et al. | |
| 8,717,545 B2 | 5/2014 | Sebastian et al. | |
| 2003/0081564 A1* | 5/2003 | Chan | G08B 13/19634 370/328 |
| 2005/0117781 A1* | 6/2005 | Aoyama | G06K 9/4633 382/103 |
| 2006/0293810 A1 | 12/2006 | Nakamoto | |
| 2007/0115352 A1 | 5/2007 | Oskiper et al. | |
| 2007/0156286 A1 | 7/2007 | Yamauchi | |
| 2008/0119961 A1 | 5/2008 | Myeong et al. | |
| 2009/0024251 A1 | 1/2009 | Myeong et al. | |
| 2009/0154791 A1 | 6/2009 | Yoon et al. | |
| 2010/0001991 A1 | 1/2010 | Jeong et al. | |
| 2010/0188510 A1* | 7/2010 | Yoo | G05D 1/0234 348/164 |
| 2010/0280754 A1* | 11/2010 | Goncalves | G01C 21/12 701/532 |
| 2010/0305854 A1* | 12/2010 | Kammel | A01D 34/008 701/469 |
| 2011/0091096 A1 | 4/2011 | Morris et al. | |
| 2011/0206274 A1 | 8/2011 | Tateno et al. | |
| 2013/0201358 A1 | 8/2013 | Sun | |
| 2015/0185025 A1 | 7/2015 | Lacaze et al. | |
| 2015/0202770 A1* | 7/2015 | Patron | G05D 1/024 700/245 |
| 2015/0212521 A1 | 7/2015 | Pack et al. | |
| 2015/0253777 A1 | 9/2015 | Binney et al. | |
| 2015/0314443 A1 | 11/2015 | Yu | |
| 2016/0025502 A1 | 1/2016 | Lacaze et al. | |
| 2016/0068156 A1* | 3/2016 | Horii | B60W 30/00 701/28 |
| 2016/0147230 A1 | 5/2016 | Munich et al. | |
| 2017/0097643 A1 | 4/2017 | Munich et al. | |
| 2017/0108867 A1 | 4/2017 | Franzius et al. | |

OTHER PUBLICATIONS

Murillo et al., "From omnidirectional images to hierarchical localization," Robotics and Autonomous Systems 55 (Dec. 2007) No. 5, pp. 372-382.
Schindler et al., "Line-Based Structure From Motion for Urban Environments," Georgia Institute of Technology College of Computing (2006) pp. 1-8.
Yuen et al., "Vision-based localization algorithm based on landmark matching, triangulation, reconstruction, and comparision," IEEE Transactions on Robotics (Apr. 2005) vol. 21, No. 2, pp. 217-226.
International Search Report dated Feb. 7, 2017, issued in PCT counterpart application (No. PCT/EP2016/076466).
Written Opinion dated Feb. 7, 2017, issued in PCT counterpart application (No. PCT/EP2016/076466).
Office action dated Aug. 3, 2018, issued in U.S. Appl. No. 15/968,838.
Ben Ghorbel et al., "3D Head Pose Estimation and Tracking Using Particle Filtering and ICP Algorithm," In: Perales F.J., Fisher R.B. (eds) Articulated Motion and Deformable Objects, AMDO 2010, Lecture Notes in Computer Science, 6169:224-237, Springer, Berlin, Heidelberg.
Hafez et al., "Particle-filter-based Pose Estimation from Controlled Motion with Application to Visual Servoing," Int J Adv Syst, 2014, 11(10):177 (12 pp).
Lee et al., "Automatic Edge Detection Method for the Mobile Robot Application," IEEE/RJS, Intl Conf on Intelligent Robots and Systems, Oct. 2003, 3:2730-2735.
Official action dated May 23, 2019, issued in EP counterpart patent application (No. 16798423.6).

* cited by examiner

MOBILE ROBOT SYSTEM AND METHOD FOR GENERATING MAP DATA USING STRAIGHT LINES EXTRACTED FROM VISUAL IMAGES

RELATED APPLICATIONS

This is a Bypass Continuation of International Application No. PCT/EP2016/076466, filed Nov. 2, 2016 and published as WO 2017/076928A1, which claims priority to European Patent Application no. EP 15192649.0, filed Nov. 2, 2015. The contents of the aforementioned applications are incorporated by reference in their entirety.

FIELD

The invention relates to mapping performed by a moving robot. More particularly, the invention relates to mapping using multiple cameras taking visual images.

INTRODUCTION

Mapping done by mobile robots and localization of mobile robots has been an active area of research since progress in robotics allowed for semi-autonomous and autonomous robots. A moving robot must have a method of at least estimating its position in space to continue motion with a purpose. The modern framework of mapping localisation comprises a coordinate system with respect to which the localization is done and a pose, which is a combination of position and orientation. Localization can be done with respect to an absolute coordinate system (such as GPS coordinates) or a relative coordinate system (such as localization with respect to some known location and/or object). The coordinate system can be chosen arbitrarily, as long as it is consistent and can be converted to some standard coordinate system (such as WGS84) if needed. Multiple sensor readings can contribute to pose calculation—it can be determined using GPS receivers, Lidar (light radar) sensors, cameras, odometers, gyroscopes, accelerometers, magnetometers, time of flight cameras and radar sensors. There is an important distinction to be made in the context of localization: it can be done based on an existing map, or it can be done simultaneously with mapping. The latter is called SLAM (Simultaneous Localization and Mapping) and is the preferred approach when localization is performed while exploring previously unknown surroundings. If a map is already available, the task becomes easier. For example, localization in indoor environments (such as an apartment or a hospital) or structured outdoor environments (such as a factory complex) is easier, since a detailed map is readily available, and it is unlikely to change significantly in the short term. Localization outdoors, in unstructured environments (such as cities, suburbs and/or villages) is a greater challenge. First, publicly available maps are not precise enough for autonomous motion by the robot. Second, even when the maps exist, they are likely to get outdated very fast, as new obstacles appear and old pathways disappear. Localization outdoors can be done with the help of a positioning system such as GPS (Global Positioning System), GLONASS (Global Navigation Satellite System) or Galileo. However, the precision of these systems (available for public use) is on the order of 1-10 meters. This would not be enough for localization used for autonomous robotic navigation.

Existing solutions to the localization problem strongly depend on the intended application of the object to be localized.

U.S. Pat. No. 8,717,545 B2 discloses a system using range and Doppler velocity measurements from a lidar system and images from a video system to estimate a six degree-of-freedom trajectory of a target. Once the motion aspects of the target are estimated, a three-dimensional image of the target may be generated.

U.S. Pat. No. 7,015,831 B2 discloses a method and apparatus that use a visual sensor and dead reckoning sensors to process Simultaneous Localization and Mapping (SLAM). Advantageously, such visual techniques can be used to autonomously generate and update a map. Unlike with laser rangefinders, the visual techniques are economically practical in a wide range of applications and can be used in relatively dynamic environments, such as environments in which people move.

The disclosed method can be implemented in an automatic vacuum cleaner operating in an indoor environment.

U.S. Pat. No. 8,305,430 B2 discloses a visual odometry system and method for a fixed or known calibration of an arbitrary number of cameras in monocular configuration. Images collected from each of the cameras in this distributed aperture system have negligible or absolutely no overlap. The system uses multiple cameras, but generates pose hypothesis in each camera separately before comparing and refining them.

Schindler, et al. (in 3D Data Processing, Visualization, and Transmission, Third International Symposium on, pp. 846-853. IEEE, 2006) discusses a novel method for recovering the 3D-line structure of a scene from multiple widely separated views. In this approach, 2D-lines are automatically detected in images with the assistance of an EM-based vanishing point estimation method which assumes the existence of edges along mutually orthogonal vanishing directions. 3D reconstruction results for urban scenes based on manually established feature correspondences across images are presented.

Murillo, A. C., et al. (Robotics and Autonomous Systems 55, no. 5 (2007): 372-382) proposes a new vision-based method for global robot localization using an omnidirectional camera. Topological and metric localization information are combined in an efficient, hierarchical process, with each step being more complex and accurate than the previous one but evaluating fewer images.

SUMMARY

The present invention is specified in the claims as well as in the below description. Preferred embodiments are particularly specified in the dependent claims and the description of various embodiments.

In a first aspect, a mapping method making use of the invention is provided. The mapping method can comprise operating at least one mobile robot comprising at least two cameras and at least one processing component. The mapping method can further comprise taking visual images with at least two cameras. The mapping method can also comprise extracting at least straight lines from the visual images with at least one processing component. The mapping method can further comprise generating map data using the extracted features from the visual images.

In a second aspect, the invention discloses a mobile robot. The mobile robot can comprise at least two cameras adapted to take visual images of an operating area. The mobile robot can also comprise at least one processing component adapted to at least extract straight lines from the visual images taken by the at least two cameras and generate map data based at least partially on the images. The mobile robot can further comprise a communication component adapted to at least send and receive data, particularly image and/or map data.

In a third aspect, the invention discloses an assembly of mobile robots comprising at least two mobile robots. Each of the mobile robots can comprise at least two cameras adapted to take visual images of an operating area. Each of the mobile robots can further comprise at least one processing component adapted to at least extract straight lines from the visual images taken by the at least two cameras and generate map data based at least partially on the images. Each of the mobile robots can also comprise at least one communication component adapted to at least send and receive data at least between the robots, particularly image and/or map data.

In some embodiments, the mapping method further comprises combining the visual images and/or the extracted straight lines in a single reference frame based on the relative placement of the two cameras. That is, the visual images from two of more cameras can be combined into one image. This step can be done before extracting the straight lines or after extracting the straight lines. In the latter case, only the extracted straight lines can be combined in a single reference frame. The reference frame can be chosen, for example, with respect to one of the cameras. The relative placement of the cameras can be computed precisely prior to starting the mapping process. This can be useful to obtain a fuller picture or map of the robot's surroundings. It can also be useful for determining whether any straight lines extracted from the images of different cameras belong to the same object on the images taken by the robot, that is, belong to the same object in the world.

In some preferred embodiments, the method can further comprise extracting location-related data from at least one further sensor. Said sensor can comprise, for example at least one or a combination of at least one GPS sensor, at least one dead-reckoning sensor, at least one accelerometer, at least one gyroscope, at least one time of flight camera, at least one Lidar sensor, at least one odometer, at least one magnetometer and/or at least one altitude sensor. The method can then further comprise combining this location-related data with the data from the visual images to build map data. That is, in some embodiments, the mobile robot can use data from its other sensors to obtain an approximate map of an operating area it finds itself in, and then refine this approximate map using the extracted straight lines. Alternatively or additionally, the robot can build map data using the extracted straight lines and other sensor readings simultaneously. This is advantageous, as the other sensors' data can serve as a "sanity check", or as a means to make the camera images-based map built from the straight lines more precise and reliable. This is described in further detail below.

Note that, the term "operating area" can refer to a region where the robot is moving. This can, for example be a certain street, or a patch of a street. For example, operating area can comprise a 1 to 1000 m region that the robot is moving through. One robot run can comprise one or a plurality of operating areas. When generating map data, the robot can, for example, generate it based on an area with a radius of 1 to 1000 m, more preferably 10 to 500 m. Once a map of one patch or area or operating area is generated, the robot can generate a map of a subsequent patch or area or operating area.

Note that the term "camera image" can also refer to camera frames.

The mapping method can further comprise using an iterative algorithm to at least associate the extracted straight lines with physical objects. That is, when generating map data, the algorithm can identify the 2D straight lines from camera images with 3D physical objects or landmarks present in the real world. For example, the algorithm can detect that a certain number of lines all belong to the same physical object or landmark and merge them into one. Conversely, the algorithm can detect that a certain line only appears in one camera image and is likely to belong to a transitory physical object such as a car, or to be caused by light and/or camera effects. In this case, the algorithm can reject this line and not assign it to a 3D physical object or landmark. Physical objects or landmarks can comprise non-transitory objects such as buildings, fences, roads, poles, windows, doors, mailboxes, street lights, street signs, and other objects comprising substantially straight features.

In some embodiments, the iterative algorithm can comprise an optimization routine that optimizes at least one robot pose and the position of the physical objects based on the extracted features. That is, the algorithm can for example take one or a plurality of robot poses and the number and positions of physical objects or landmarks as unknown variables, and optimize their values based on the straight lines extracted from camera images. In some embodiments, the algorithm can also take data from other sensors into consideration, for example GPS sensor or other sensors listed above and below.

Note, that in the present document, the terms "physical object" and "landmark" can be used interchangeably.

In some embodiments, the iterative algorithm can comprise at least combining lines belonging to the same physical object from images taken by different cameras. It can also comprise discarding lines belonging to transient objects and/or light or camera effects. That is, one landmark or physical object can be detected by different cameras at the same time frame and/or by the same camera at several time frames and/or by different cameras at several time frames. The algorithm can be adapted to combine the lines extracted from several images and associate them to a certain landmark with a certain fixed position on a map (with a corresponding error). Conversely, if a certain line is detected in too few frames—be they from the same camera at different time points and/or from different cameras at the same or different time points, this line can be an artefact of the light or of the camera. It could also be a transient feature such as a car (which should not comprise part of a map). In this case, the algorithm can be adapted to discard or cull the corresponding line.

In some embodiments, each of the robot cameras can be adapted to capture 3 to 5 images or frames per second, preferably 4 images or frames per second.

In some embodiments, the robot comprises at least 4 cameras. In some preferred embodiments, the robot comprises 8 or 9 cameras.

The map data that the robot can generate can comprise a plurality of vectors, point features and/or grid features defined with respect to a coordinate system. This coordinate system can be tied to the robot, for example with one of the cameras serving as the origin and the direction of motion as the x-axis. The coordinate system can also be independent of the robot, such as a GPS system for example. The grid features can comprise extended objects that are not lines, such as, for example, geometrical shapes. For instance, in some embodiments, the street poles can be modelled as geometrical objects with a radius varying with height. These can then be considered grid features. Furthermore, rectangular or substantially rectangular objects can be considered grid features. These can comprise, for example doors, windows and/or other objects.

Additionally or alternatively, substantially circular, oval, triangular and differently shaped objects can comprise grid features. The map data can simply comprise a collection of numbers corresponding to the positions of straight lines and/or of physical objects (landmarks) and/or of robot poses with respect to some coordinate system. There can also be a plurality of coordinate systems defined for map data. The map data can further comprise lines obtained on the basis of camera image lines. That is, the lines extracted from camera images can be run through an algorithm to verify whether they belong to actual landmarks (that is, physical objects), and whether some of them can be combined. At this stage, the position of the lines with respect to each other and/or with respect to the robot can be adjusted, as lines extracted from images taken by different cameras and/or taken at different time points can be combined if it is determined that they belong to the same landmarks. Some lines can also be discarded if it is determined that they likely belong to transient objects (such as trucks or cars), light effects and/or camera effects. Map data can then comprise this collection of lines based on the lines extracted from images, but processed by a certain algorithm to comprise mostly or solely lines belonging to landmarks, combined lines, and/or lines with an adjusted position. Map data can further comprise error estimates associated with vectors, point features, and/or lines associated with landmarks. Map data can further comprise visibility information. That is, information about from which locations given landmarks can be seen. In other words, if, for example, a wall would obstruct a landmark or physical object, so that it cannot be seen from locations behind the wall, this information can also be comprised in map data. This is practical, as when, for example, the robot uses the map to navigate, it will not detect landmarks of physical objects that are nearby, but obstructed. The visibility information can also take into account the height of the robot's cameras to determine which object can be visible at which locations.

In some embodiments, the communication component can be adapted to exchange map data and/or image data with a server, particularly for at least refining map data by the server. "Refining" can refer, for example, to actually building a map. In some embodiments, the algorithm for building a map can be run on the server. In such embodiments, the robot can send map data comprising the extracted straight lines from the camera images, potentially combined and arranged with respect to a single coordinate system, to the server. The server can then run the optimization algorithm that can compute the robot poses and the locations of physical objects or landmarks, that is, build a map. In other embodiments, the algorithm can run on the robot, that is, on the processing component of the robot, and the map data sent to the server comprises a map of some operating area. In such embodiments, the server can serve to combine the map of multiple operating areas into a single neighbourhood map, town map, city map, world map, or just a map of some larger region. "Refining" can also comprise improving the accuracy of the map data sent by the robot, that is running the optimization algorithm again, or running another algorithm to obtain better map data. Note, that the term "map data" is used herein to refer to both map data generated by the robot's processing component and the server. A skilled person will understand, that generating map data can be done on the robot, on the server or on both. Intermediate map data, such as, for example, straight lines extracted from images, can comprise map data. Map data comprising association of lines with landmarks or physical objects with the corresponding errors can comprise further map data and/or final map data that can be generated either by the robot and/or by the server.

In some embodiments, the robot can be further adapted to navigate using the map data from the processing component and/or from the server. That is, the robot can use the map data to localize itself and to chart a course for itself.

In some preferred embodiments, the robot can further comprise sensors adapted to measure further parameters for building map data. The sensors can comprise, for example, at least one or a combination of at least one GPS component, at least one accelerometer, at least one gyroscope, a least one odometer, at least one magnetometer, at least one pressure sensor, at least one ultrasonic sensor, at least one time of flight camera sensor, and/or at least one Lidar sensor.

In some preferred embodiments, the robot can be autonomous and/or semi-autonomous. That is, the robot can be adapted to navigate and/or to drive autonomously for a significant proportion of a given run. In some embodiments, the robot is adapted to navigate and/or drive autonomously for at least 50% of its total operating time. In some other embodiments, when gathering image data for building map data, the robot can be remotely controlled by a remote operator. That is, the robot can be controlled and/or driven by a person and/or by a server and/or by a second processing component.

The robot can further be adapted to travel or drive with a speed of no more than 10 km/h, more preferably no more than 8 km/h, or no more than 6 lm/h, preferably between 3 and 6 km/h, or, more preferably, between 4 and 5 km/h.

In embodiments comprising an assembly of mobile robots, that is two or more mobile robots, the robots can be adapted to communicate, or exchange data via their respective communication components. The communication can be direct and/or routed through a server. In such embodiments, the data sent between the robots can be combined into a map of multiple operating areas. As mentioned above, this can, for example, mean that the server can receive map data from at least two mobile robots and combine this data into a map or map data of both of their operating areas. In some other embodiments, a first robot can collect images of an operating area, extract straight lines, build map data out of them, and then transmit said data to a second robot so that it can navigate the same operating area using the map data of the first robot. The transmission of map data can be done directly between the robots and/or done via a server. That is, in some embodiments, the assembly can further comprise a server adapted to at least communicate with the robots via their communication component, particularly to receive map data and/or image data from a first robot, process it and send processed data to a second robot when requested. In some embodiments, "processing data" by the server refers simply to assigning it to the respective operating area in relation to other operating areas. In other embodiments, "processing" can refer to creating further map data and/or improving the obtained map data.

Below follows a detailed description of one preferred embodiment of the mapping method that can be implemented at least partially by the mobile robot.

The mapping method can be implemented as a probabilistic algorithm that takes certain input variables and returns certain output variables. Input variables can comprise, for example, the robot's pose, the lines detected on the visual images and/or certain objects with known real world coordinates. The output variables can comprise, for example, location of landmarks on a robot-dependent coordinate system, i.e. a map of a certain region. Landmarks can comprise structures such as buildings, doors, fences, poles, street signs, windows and other preferably man-made structures easily identifiable by straight lines. Such landmarks can generally be separated into two types: line type landmarks and pole type landmarks. That is, landmarks that are substantially vertical can comprise pole type landmarks and landmarks that are substantially horizontal can comprise line type landmarks.

Suppose a robot is driven through some area. This can be referred to as a robot run. Along the way it can pick up sensor readings such as the GPS position, movement distance from the odometer, rotation information from the gyroscope, camera images, accelerometer data, and potentially other readings. Two quantities can be defined in this context: the map (M) and sensor readings (R). The map M is a collection of all the landmarks the robot can see with its camera. The map can also contain the exact path the robot took. It can be simply defined as a vector of numbers:

$$M=(m_1,\ldots,m_{|M|})$$

The values of M are unknown in the mapping problem, so it is the variable to be determined. Furthermore, it is not known how many landmarks there are or the type of those landmarks. The sensor readings R can likewise be defined as a vector of numbers, $$R=(y_1,\ldots,y_{|R|})$$

It is the result of an actual robot run and is a constant quantity in the following Bayesian statement:

$$P(M \mid R) = \frac{P(R \mid M) P(M)}{P(R)}$$

The statement is simply the Bayes theorem that establishes the relationship between conditional probabilities. It establishes the relationship between conditional probabilities $P(A|B)$ (probability of A given B) and $P(B|A)$ (probability of B given A). This is well known to the person skilled in the art.

That is, if some map was known, the relationship of its probability given the sensor readings to the probability of having such readings or map independently at all could be established. These probabilities can be almost impossible to numerically quantify. However, their exact values are not actually needed. Only the "best" map should be found, defined as:

$$M_{BEST} = \underset{M \in \mathbb{M}}{\mathrm{argmax}}\, P(M \mid R)$$

That is, the map maximizing the probability of the map M given the obtained sensor readings R. From a camera image, a series of lines or edges is obtained. These lines correspond to the landmarks on the map. However, it is not known which lines are associated to which landmarks. Some of the lines are also noise. The problem set can thus be summarized as follows:
determine the number of landmarks |M| and their types
determine which 2D lines from camera images are associated to which landmarks find the best map $M_{BEST}$ given the sensor readings.

The map M can contain two parts: the path the robot took and the location of the landmarks, so that $$M=(M_P,M_L)$$

It can be natural to quantize the path into a set of poses coinciding with the times the camera images were taken. So, if $N_P$ camera images were taken (at times $t_1, \ldots, t_{N_P}$), then the robot path part of the map can look as $$M_P=(x_1^P,y_1^P,z_1^P,\alpha_1^P,\beta_1^P,\gamma_1^P,\ldots,x_{N_P}^P,y_{N_P}^P,z_{N_P}^P,\alpha_{N_P}^P,\beta_{N_P}^P,\gamma_{N_P}^P)$$

where a pose is represented by six values $x_i^P$, $y_i^P$, $z_i^P$, $\alpha_i^P$, $\beta_i^P$, $\gamma_i^P$ (the robot position and the Euler angles).

As mentioned above, it can be useful to categorize the landmarks into line type and pole type. Line type landmarks can be formed by edges (building corners, pavement edges, window edges, etc). In 3D space they can be represented by four numbers: position $x_i^L$, $y_i^L$ and orientation Euler angles $\alpha_i^L$ and $\beta_i^L$, provided a constant reference frame (describing the line's "vertical space") represented by rotation matrix $R_i^L \in \mathbb{R}^{3\times 3}$ and origin $c_i^L \in \mathbb{R}^{3\times 1}$ are given.

If there are $N_L$ line type landmarks, then the landmark part of the map vector is $$M_L=(x_1^L,y_1^L,\alpha_1^L,\beta_1^L,\ldots,x_{N_L}^L,y_{N_L}^L,\alpha_{N_L}^L,\beta_{N_L}^L)$$

To conclude, if there are $N_P$ poses and $N_L$ landmarks, then the line type landmark part of the map M is simply a vector of $6 \cdot N_P + 4 \cdot N_L$ numbers (assuming that the origin and reference frame for the line type landmarks are given).

Vertical or substantially vertical lines can comprise pole type landmarks. Many vertical lines can be generated by poles—lamp poles, traffic sign posts, fence posts, trash cans, bollards, etc. These landmarks can also be modelled and added as input variables into the map M.

Note that associating lines detected from camera images to landmarks can be challenging. Some lines belong to the same landmark, while other lines don't belong to landmarks at all (they can be detected due to a shadow on the ground, a moving car, a light trick, or something else). To accurately associate lines to actual landmarks, lines can be tracked across multiple robot poses (i.e. as the robot moves and the cameras take images at different positions and orientations of the robot), some lines can be merged together, some lines can be discarded, color can be compared on each side of the lines. The association can be done as an iterative algorithm smoothly adjusting landmark candidates and culling them as needed.

The sensor readings obtained during a robot run are constant. Therefore, in the original Bayesian statement, $P(R)$=const. The quantity $P(M)$ corresponds to the probability of getting a certain map M from the set of all possible maps. This set is unrestricted, and therefore very large. In practice, only maps that are physically possible within the context of the chosen data model are considered. The probability of obtaining such M from the set of all maps is about the same. Therefore, also $P(M)$ const. What is left to estimate is $$P(M|R)|R) \propto P(R|M)$$

That is, the probability of the map given certain readings is proportional to the probability of the readings given the map. $P(R|M)$ can be quantified in the following way. $P(R|M)$ is the probability of getting sensor readings R if given map M. Sensor readings contain errors. A further approximation can be made by stating that the sensor readings are approximately normally distributed, that is $$R \sim N(\mu, \Sigma)$$

where μ are the error free values (ground truth that is not known) and Χ is the covariance matrix that can be derived from the properties of the sensors and the readings taken. While μ is not known, given the best map, its approximation can be calculated, that is $\mu \approx \mu(M_{BEST})$.

The form of the probability P(R|M) can now be approximately stated as:

$$P(R \mid M) \cong C_w e^{-\frac{1}{2}(\mu(M)-R)^T \Sigma^{-1}(\mu(M)-R)},$$

where $C_w$ contains the normalization constant. The goal is to maximize P(M|R)—this is equivalent to maximizing the value P(R|M), or, equivalently, minimizing its negative logarithm:

$$\ln P(R \mid M) = -\frac{1}{2}(\mu(M) - R)^T \sum^{-1}(\mu(M) - R) + C_L,$$

$$M_{BEST} = \underset{M \in \mathbb{M}}{\mathrm{argmax}}(\mu(M) - R)^T \sum^{-1}(\mu(M) - R),$$

$$S(M) = (\mu(M) - R)^T \sum^{-1}(\mu(M) - R),$$

So, to find the best map $M_{BEST}$, the sum S(M) should be minimized. The problem of finding the best map has been reduced to one of nonlinear minimization. The process can run as an iterative optimization algorithm aiming to maximize the overall probability of obtaining a certain map given the known sensor readings.

In some preferred embodiments, the method comprises an error capping step, wherein the errors associated with the robot's sensors are capped. Preferably, the errors associated with systematic sensor errors and/or invalid physical object (or landmark) associations of the camera image lines are capped.

Looking at different maps M and determining which one minimizes the sum S(M) should yield the most likely map, given that the sensor readings are normally distributed. That is, that the errors associated with the values that the sensors obtained are normally distributed. However, the errors associated with sensor readings can be inherently non-Gaussian, or may contain various systematic errors due to external and internal causes. For example, systematic errors can include the following: a constant or slowly-decaying offset; bias of the sensor in a certain direction; non-modelled or incorrectly sensed robot behaviour (for example, wheel slippage can result in erroneous odometry reading); incorrect feature association to a landmark (for example, a line extracted from a camera image can be associated to a wrong landmark); sensor reading timing offset (a sensor reading can actually be from a time before or after the sensor-reported time); incorrect calibration of a sensor; change of sensor orientation within the robot reference frame due to the robot flexing during movement or due to vibration; sensor misbehaving due to external environmental factors (for example, magnetometer readings can be unreliable when the robot passes close by a large metal object or an electrical conduit); sensor misbehaving due to inherent problems or defects in its design or manufacture etc.

These sensor reading errors can result in outliers that can severely distort the sum S(M), resulting in an incorrect map, or even in a complete failure of the optimization algorithms. It is assumed that most sensors produce correct results (normally distributed with known covariance) most of the time. However, it is not known which readings are normal and which contain systematic errors; therefore, to avoid failure of the algorithm or producing the wrong maps, a technique for capping the sensor errors can be used.

The sum S(M) can be diagonalized (as is known in the art and obvious for the skilled person) into $$S(M) = \sum_{i=1}^{|R|} \left[\left(\frac{g_i(M,R)}{\sigma_i}\right)\right]^2$$

To compensate for the systematic errors, this sum of squared scaled errors can be modified by introducing an error capping function α(x), so that $$S(M) = \sum_{i=1}^{|R|} \left[\alpha\left(\frac{g_i(M,R)}{\sigma_i}\right)\right]^2$$

The function α(x) can be chosen so that α(x)∝x when |x|<$x_L$, where $x_L$ is in the range of linearity (so that the function is approximately linear around the origin), and the function is constrained so that |α(x)|<∈ when |x|<$x_C$, where $x_C$ is the maximum possible sensor error and ∈ is the maximum allowed error (that can be adjusted according to testing for example). One function that can be used here is the arctangent. Similarly behaving functions can also be used. In preferred embodiments, the function α(x) can be strictly monotonic. In other preferred embodiments, the function can have a continuous first derivative. The function α(x) can be scaled to pick a suitable range of linearity $x_L$ and the maximum error value E. Different parameters of linearity and of maximum error can be used for different sensors. The parameters may also be changed dynamically when additional information is known about the operation of the sensor of during the minimization algorithms as the map M converges to its best value. In preferred embodiments, the linear range $x_L$ can be within 1-10 and the maximum error value E can be within the range 10-100 (assuming sensor errors are scaled to realistic values). Aside from the diagonal form of S(M) (as shown above), the error capping can instead be applied directly to the elements of vector μ(M)–R if suitable scaling is used. Then, the error capping can be applied without transforming S(M) to its diagonal form.

This modification allows for large occasional systematic errors in the sensor readings and feature associations to landmarks, while at the same time yielding to the standard algorithms used for nonlinear minimization. Such algorithms can comprise, for example, the gradient descent method, nonlinear conjugate gradient methods, quasi-Newton methods, the Gauss-Newton method, the Levenberg-Marquardt method etc. The modification works with Newton-based methods, because the capping function is linear around the origin. The modification can work best with gradient-based methods when the capping function α(x) is strictly monotonic. The error capping step of the algorithm can be particularly advantageous, as it can increase the robustness of the map finding. Using error capping allows the algorithm to cope with systematic sensor and association errors while still producing accurate maps. It further allows for use of standard and efficient optimization algorithms such as the Levenberg-Marquardt for example. After several iterations of the optimization algorithm have been run, and the resulting map M is very close to $M_{BEST}$, the sensor readings with large systematic errors and/or invalid landmark associations can be easy to differentiate from the rest of the data. These sensor readings and/or invalid landmark associations can then be removed from the sum S(M). After this, the optimization algorithm can be run again to further improve the map quality.

In some other preferred embodiments, the error capping can comprise a standalone method for modifying error terms in least squares-based optimization algorithms. The method comprises acquiring a plurality of data points with corresponding error estimates by measuring a physical system. The method further comprises constructing a model comprising a plurality of parameters to be determined, said model describing the physical system. The method further comprises computing residual errors of the data points using the model and its parameters. The method further comprises scaling the residual errors by data point error estimates. The method further comprises applying an error cap function to the scaled residual errors. The method further comprises summing the squared capped scaled residual errors. The method further comprises minimizing the sum by changing the model parameters.

The model parameters can comprise, for example, the map in the case where the error capping is used within the mapping method as described in the present document. That is, the landmarks and/or poses of the robot on a certain coordinate system.

The model can comprise an approximation of the physical system. That is, the model can provide a framework of relations between the measurable quantities. However, the precise mathematical details of the model can be unknown to start with. These can comprise coefficients, exponents, angles, lengths and so on. Those unknowns can comprise the parameters (in the current application, the map).

In some embodiments, the error cap function is strictly monotonic. The error cap function can comprise a continuous first derivative. The error cap function can be approximately linear around the origin. The error cap function can be bounded from below and from above by a maximum allowed error value. The error cap function can comprise an arctangent function. The error cap function can also be as described above and/or below in the figure description.

Though in the present document, the error capping method is described as a part of the mapping method, a skilled person will understand that it can be applied more generally to a wide array of optimization algorithms. It is particularly advantageous, as it can allow using standard algorithms such as the Levenberg-Marquardt ones for complex problems (such as the present mapping problem). Without the error capping method, the standard algorithm can fail or return sub-optimal results. However, it can be much more robust with this method.

In some embodiments, the method can be used to cap systematic errors comprised in sensor readings. In such embodiments, it can be used to improve the robustness of an optimization algorithm and to increase the likelihood of obtaining parameters that conform the closest to the physical system.

In some embodiments, the method can be used in conjunction with the Levenberg-Marquardt algorithm to at least compute a non-linear least squares problem.

In some other embodiments, the method can be used in conjunction with a gradient-based optimization algorithm to at least compute a non-linear least squares problem.

In some preferred embodiments, the method can be used as part of the optimization algorithm to find the best possible map of a mobile robot's surroundings. That is, this use of the error capping method is described in more detail above as pertaining specifically to the current mapping method.

The method can be used as part of the localization algorithm to find a mobile robot's position and orientation with respect to a map. For example, the error capping can be used when localizing the robot using the map built according to the presently described method.

The method can be used as part of the optimization algorithm for calibrating the positions and orientations of a plurality of cameras fixed with respect to each other. That is, a mobile robot with a plurality of cameras can require a calibration of said cameras. This can be advantageous, as knowing the precise camera positions with respect to each other can yield more accurate combinations of images taken by different cameras for example.

In some embodiments, data points can comprise at least one or a combination of sensor readings such as GPS coordinates, altitude, odometry data, and/or straight lines extracted from camera images.

In some embodiments, parameters can comprise a map comprising a plurality of landmarks placed on a coordinate system.

In some embodiments, the least squares-based optimization algorithm can be used to generate map data of a mobile robot's surroundings using at least sensor data from the mobile robot and wherein parameters comprise a map comprising the path taken by the mobile robot. In some embodiments, the errors capped comprise at least one or a combination of systematic errors associated with sensors of a mobile robot such as a GPS component and/or errors associated with associating lines extracted from visual images to landmarks on a coordinate system.

In some embodiments, the method can comprise diagonalizing a covariance matrix associated with the error estimates prior to scaling the residual errors by data point error estimates. That is, in some more complex least-squares problems, the errors associated with data points can comprise a covariance matrix. In such embodiments, the error capping can be performed after diagonalizing this matrix. Then, the error capping function can be applied to the diagonal elements and the method can proceed as before.

In some embodiments, the method can be used to cap association errors arising from associating data points with incorrect model components. That is, in the present mapping method application, this can refer to errors arising from false associations of lines to landmarks. In such embodiments, the model can comprise a map and model components comprise landmarks and/or physical objects and/or path poses.

The mapping algorithm can be run on "patches" or "regions" of the total path that the robot is taking. For example, the mapping algorithm can be run on 300 robot poses. If the robot travels at about 5 km/h (1.4 m/s) and there are about 4-5 poses per second (as poses can be measured simultaneously with the camera images being taken), 300 poses can correspond to a patch of about 94 meters. In general, one patch can comprise between 100 and 10000 robot poses, but preferably around 100-1000 robot poses.

In some preferred embodiments, the method can be used as a SLAM method by an autonomous and/or semi-autonomous mobile robot. SLAM refers to simultaneous localization and mapping. That is, in some embodiments, the method can be run on the robot as it navigates autonomously and/or semi-autonomously. As the algorithm can also yield the path that the robot took, the robot can localize itself and build map data of its surroundings simultaneously. This can be particularly advantageous, as the robot can then just navigate through an unfamiliar area and build map data of it without previously knowing what the area looks like. In some embodiments, the invention provides a mobile robot comprising (i) at least one memory component comprising at least map data, (ii) at least two cameras adapted to take visual images of an environment, and (iii) at least one processing component adapted to at least extract straight lines from the visual images taken by the at least two cameras and compare them to the map data to at least localize the robot.

In some embodiments, the invention provides an assembly of mobile robots comprising at least two mobile robots, and each of the robots comprising (i) at least one memory component comprising at least map data, (ii) at least two cameras adapted to take visual images of an environment, (iii) at least one processing component adapted to at least extract features from the visual images taken by the at least one camera and compare them to the map data to at least localize the robot, (iv) and at least one communication component adapted to send and receive data between the robots, particularly image and/or map data.

In some embodiments, a mapping method making use of the invention is provided. The mapping method can make use of any features of the system listed above and below. The mapping method comprises (i) operating at least one mobile robot comprising at least two cameras and at least one processing component, (ii) taking visual images with the at least one robot's at least two cameras, (iii) performing preprocessing on a file generated by combining visual images from the at least two cameras, (iv) extracting features from the individual visual images with at least one processing component, and (v) building map data using the extracted features from the visual images.

In some embodiments, the invention provides a mobile robot comprising (i) at least one memory component comprising at least map data, (ii) at least two cameras adapted to take visual images of an environment, and (iii) at least one processing component adapted to at least extract features from the visual images taken by the at least two cameras and compare them to the map data to at least localize the robot.

In some embodiments, a localization method making use of the invention is provided. The localization method can make use of any features of the system described herein. The localization method comprises (i) operating at least one mobile robot comprising at least two cameras, at least one memory component, and at least one processing component, (ii) taking visual images with the at least one robot's at least two camera components, (iii) performing preprocessing on a file generated by combining visual images from the at least two cameras, (iv) extracting features from the individual visual images with at least one processing component, (v) comparing the extracted features with existing map data stored on the at least one robot's at least one memory component, and (vi) localizing the at least one robot using the comparison in (v). In some embodiments, a localization method making use of the invention is provided. The localization method can make use of any features of the system described herein. The method comprises (i) providing at least one mobile robot comprising at least one dead reckoning component, at least two cameras, at least one memory component, and at least one processing component; and (ii) taking visual images with the at least one robot's at least two camera components; and (iii) extracting features from the individual visual images with at least one processing component; and (iv) obtaining location related data from the extracted features in (iii); and (v) receiving location related data from the at least one dead reckoning component; and (vi) combining location related data obtained from the features extracted from the visual images in (iv) and location related data received from the at least one dead reckoning component in (v) weighted based on errors associated with each of them; and (vii) forming a hypothesis on the robot's pose based on the combined data in (vi).

The mobile robot can be an autonomous and/or a semi-autonomous robot. The robot can be land-based. The robot can be adapted to move on the ground. In particular, the robot can be wheeled and adapted to move in unstructured urban areas that include moving and stationary obstacles. In one embodiment, the robot comprises a set of at least 4 (four) wheels mounted on a frame. The robot can further comprise a body mounted on the frame. The robot can further comprise lights mounted on the body and/or on the frame. The lights can be LED lights. The lights can assist the robot with localization and/or navigation on short scales and/or with obstacle detection. The lights can illuminate the environment in which the robot operates in the dark and/or dusk. Additionally or alternatively, the robot can comprise at least one microphone and/or at least one speaker, for communicating with its surrounding, for example pedestrians in an urban area, such as on a pedestrian path.

Cameras and other components described herein can be mounted on the frame and/or on the body of the robot. In one particular embodiment, the dimensions of the robot are width: 40 to 70 cm, such as about 55 cm, height: 40 to 70 cm, such as about 60 cm, length: 50 to 80 cm, such as about 65 cm. The invention can comprise more than one robot. In one embodiment, the robot can operate autonomously during most of its operation, such as about 95% of the time, about 97% of the time, about 98% of the time, or about 99% of the time. The robot can be adapted to travel with a speed of no more than 10 km/h, or no more than 8 km/h or no more than 6 km/h. In a preferred embodiment, the robot drives with a speed between 3 and 6 km/h and/or between 4 and 5 km/h. In a preferred embodiment, the robot can be used for delivery purposes. The robot can comprise an enclosed space within its body where at least one delivery can be stored during the transit. The robot can further comprise a secure access device for providing access to the space. This device can be a lock and/or a closure mechanism controlled by a secure interface. The robot and the delivery can have a combined weight of no more than 40 kg, such as no more than 35 kg, such as no more than 30 kg, such as no more than 25 kg. In a preferred embodiment, the robot and the delivery have a combined weight of 10-25 kg, more preferably 10-20 kg.

The memory component of the mobile robot can comprise a Random Access Memory (RAM) device. It can be a standalone component or, in a preferred embodiment, an integrated part of a System on a Chip (SoC). The memory component preferably stores at least map data that can relate to the robot's current and/or prospective operating area. The operating area, also referred to as area of operation, can be fixed or can be modified during the course of the robot's operation. In a preferred embodiment, the operating area comprises an inhabited region that can consist of a city, a village, a neighbourhood and/or an arbitrarily defined part of a city. The operating area can also comprise regions with standalone human habitations and/or regions frequented by humans. The map data that can be stored within the memory component can comprise a plurality of vectors, straight lines, point features and/or grid features defined with respect to some coordinate system. The map data can comprise two points and/or a point and a direction defined with respect to an arbitrary but fixed coordinate system. The coordinate system can be a Cartesian coordinate system approximating such a part of the globe so that the curvature does not introduce significant error. The coordinate system can be converted to a GPS coordinate system (for example WGS84) and/or other standard systems. The map data can also thus be converted to a standard coordinate system such as GPS coordinates.

The cameras on the robot are typically adapted to take visual images of the surrounding environment of the robot within its operating area. Typically, the surrounding environment comprises closely located visual objects, such as objects that are located within a radius of about 1 km or less, 500 m or less, 300 m or less, 200 m or less or 100 m or less from the robot. Accordingly, the robot can be adapted to take and process images of the surroundings of the robot that are within a radius of about 1 km or less, 500 m or less, 300 m or less, 200 m or less or 100 m or less. The environment is typically an unstructured outdoor environment that changes with time and the geographical surroundings of the robots as it travels along its path. The environment can also be at least partially indoor, or under a roof, for example if the robot is travelling through a mall, garage, apartment complex, office buildings, or the like.

The cameras of the mobile robot can be for example similar to smartphone cameras. They can be adapted to capture 1-10 images per second, more preferably 3-5 images per second or more preferably 4 images per second. The camera viewing angles can be 10°-120°, more preferably 40°-100°, more preferably 60° by 80°. The robot can comprise a plurality of cameras. In a preferred embodiment, the robot comprises at least 4 (four) cameras. In a more preferred embodiment, the robot comprises 9 (nine) cameras. The cameras can be placed anywhere around the body of the robot, preferably in positions optimizing the viewing angles of the different cameras. Some cameras can be stereo cameras. In a preferred embodiment, one pair of front cameras are stereo cameras. In a more preferred embodiment, the robot comprises 4 (four) pairs of stereo cameras. In this preferred embodiment, the stereo cameras are positioned in the front of the robot, on both sides of the robot and on the back of the robot. One more camera is positioned in the front of the robot. The stereo cameras can be used to triangulate objects captured in the visual images. Depth perception of the visual images can be improved with stereo cameras. The separation between the stereo cameras can be 5-20 cm. In a preferred embodiment, the separation between the front and back stereo cameras is 5-10 cm and the separation between the sides stereo cameras is 15-20 cm. The cameras can be placed on the robot so as to take landscape orientation visual images and/or portrait orientation visual images. Landscape orientation visual images can be understood to mean visual images wherein the wider camera capture angle is approximately parallel to the ground and the narrower camera capture angle is approximately perpendicular to the ground. In a preferred embodiment, the side cameras are placed in a portrait orientation and the front and back cameras are placed in a landscape orientation. In one embodiment, the cameras can take visual images of an unstructured outdoor environment. This environment can comprise at least one or any combination of pedestrian paths comprising stationary and moving obstacles (for example pedestrians, animals, strollers, wheelchairs, mailboxes, trash cans, street lights and the like), vehicle roads including vehicles, bicycles, traffic lights and the like and/or other traversable environments such as parking lots, lawns and/or fields.

The use of a plurality of cameras to map the surroundings of the robot can be particularly advantageous. A plurality of cameras can be pointed in a plurality of directions, therefore covering a larger part of the robot's surroundings. Furthermore, if one camera comprises a defect and/or gets blocked, the other cameras can allow the robot to still record enough data to build a map and/or to perform localization. This can be particularly relevant for a robot operating outdoors, as weather conditions such as sunlight, rain, snow, fog, hail or similar can obstruct the view of the cameras. Multiple cameras are also particularly advantageous for the current inventions, as some landmarks and/or physical objects can be seen on images taken by different cameras. This can be used by the algorithm to confirm that those lines do belong to a landmark and/or to a physical object. Conversely, if a line or several lines are seen only on one camera, the lines can be an artefact of the light and/or a transient object captured only by one camera. This is very advantageous when lines are being associated to landmarks and/or compared with an existing map.

The processing component can be part of and/or comprise a System on a Chip (SoC), for example similar to smartphone processors. The memory component can be part of the same SoC. The processing component can be adapted to localize the robot using the visual images captured by the cameras. The processing component can preferably also be adapted to extract features from the visual images captured by the cameras. In one preferred embodiment, the features can be straight lines. The straight lines can be extracted by applying an edge detection algorithm (such as Canny algorithm for example) followed by a line extractor algorithm (such as Hough transform for example) to the preprocessed visual images. Preprocessing can include combining the images, sharpening the images, smoothing the images and/or adding contrast to the images. It can also include any adjustment to image color scheme.

The extracted features can be used to build a map of the robot's operating area and/or to localize the robot using an existing map. A map can comprise a collection of vectors and/or lines and/or line segments and/or point features and/or grid features defined with respect to some coordinate system. The map can be preloaded onto a memory component of the robot. Alternatively, the map is downloaded onto the memory component during operation. The map can be downloaded in fragments as the robot is moving between geographical areas.

The cameras on the robot can take visual images of the robot's surroundings during its roving in an operating area. The cameras can be adapted to take images with a frequency of 1 to 10 images per second, such as 2 to 8 images per second, or 3 to 7 images per second, or 3 to 5 images per second, or 4 to 6 images per second. In one embodiment, the cameras are adapted to take images at a frequency of 4 images per second. Preferably, image capture is performed continuously during the robot's operation at the described frequency, i.e. the robot is preferably adapted to take images continuously using at least one, and preferably all, of the cameras during its operation. The visual images can then be combined into one file and preprocessed. Preferably, the images from different cameras are taken simultaneously. This can mean that the time difference of the different images to be processed is considerably shorter than the time between successive images that are processed. After preprocessing, the file containing preprocessed image data is separated into individual image files representing the different cameras, and the straight lines are extracted from the individual images. The straight lines are then combined and used to build map data of the robot's operating area.

In yet another embodiment, the robot already has stored map data on its memory component. The extracted straight lines are then compared with stored map data and run through a particle filter to model the probability distribution of the robot pose. An optimal pose is then chosen based on the comparison.

The processing component is adapted to localize the robot with an error of at most 10 cm. In a preferred embodiment, the processing component is adapted to localize the robot with an error of at most 5 cm. In a more preferred embodiment, the processing component is adapted to localize the robot with an error of at most 3 cm. The precision of the localization can depend on the number of the cameras and/or on the knowledge of the relative positions of the cameras and/or on the calibration of the system. Localization can be more precise for objects located closer than for objects located further away.

The processing component can combine the features extracted from visual images taken by different cameras into a coherent map and/or localize using the combined extracted features. The processing component is adapted to provide instructions about navigation of the robot, by using visual localization based on the extracted features, as well as map information and information about the intended destination of the robot. Navigation can include changing the pose of the robot (6 degree-of-freedom position and orientation data) by moving in some direction and/or rotating. Navigation can further include making decisions about the best course of movement and adapting those decisions based on the localization information.

The robot can further comprise a plurality of sensors adapted to measure different parameters related to the environment and/or to the localization of the robot. The sensors can comprise at least one or any combination of at least one GPS component, at least one accelerometer, at least one gyroscope (in a preferred embodiment 4 (four) gyroscopes), at least one odometer, at least one magnetometer, at least one time of flight camera and/or at least one Lidar sensor. A preferred embodiment comprises at least one of all of those sensors. In a preferred embodiment, the sensors measure data related to the pose of the robot. The processing component localizes the robot by first processing the sensor data for an approximate pose estimate, and then improving this estimate by using visual localization. The pose improvement can for example be done by using a particle filter. The features extracted from the visual images can be compared to a map comprising features corresponding to a certain set of different poses.

The particle filter can then select the most likely pose estimate from the set based on the likelihood of each pose. The processing component can be adapted to localize the robot based on an iterative algorithm estimating robot pose at set time intervals. This iterative algorithm can rely on an application of the particle filter method. A hypothesis on a robot's pose can include data from at least one sensor such as at least one camera, a GPS component, an odometer, an accelerometer, a time of flight camera, and/or a magnetometer. A sensor's data can further be absolute (such as data from a GPS component and/or data obtained from visual camera images for example) or relative to previous robot pose (such as data from odometers and/or gyroscopes for example).

The robot can further comprise a pressure sensor. The pressure sensor can be used for precise altitude-based localization. In one embodiment, another pressure sensor can be located at a known location within the robot's area of operation, for example at a hub. The hub can be a physical location (for example a parking lot), a physical structure (for example a house, a warehouse, a shipping container, a barn, a depot and/or a garage), and/or a mobile structure (for example a truck, a trailer and/or a train wagon). The hub can serve as a storage, maintenance, repair, recharging and resupply station for the robot. One hub can comprise one or more robots. In a preferred embodiment, one hub can service a plurality of robots, such as 20-200 robots. With a pressure sensor placed at the location of the hub, a precise altitude reference is established, and the localization of the robot can be improved by comparing the data from the robot's pressure sensor to the data from the hub's pressure sensor.

The robot can further comprise a communication component adapted to exchange data with one or more server, particularly image and/or map data. The server can comprise multiple servers and/or a cluster of servers and/or one or more cloud servers. In one preferred embodiment, the server is a cloud server. In another embodiment, the server comprises a cluster of servers, some of which can be cloud servers. The server can store, analyse and/or send out data, such as for example map and localization related data. The server can also perform calculations, for example calculations related to the generation of a geographical map, localization calculations, and/or route calculations for the robot. The communication component can comprise at least one slot for a Subscriber Identity Module (SIM card), preferably two slots for two SIM cards. The use of two SIM cards is an advantage, since it increases reliability and allows for simultaneous communication via both SIM cards for larger and/or faster data transmission. In a preferred embodiment, two different mobile operators are used for operation using the two SIM cards. In this case, if one mobile operator does not provide coverage in some part of the robot's area of operation, the robot can still communicate via the other SIM card.

The robot can further be adapted to receive navigation instructions from the server at specific intervals and/or after requesting input from the server. In one embodiment, the robot receives navigation instructions every 50-150 meters. The robot can further send a request for input to the server when faced with an unfamiliar situation. The robot can also request manual input about its navigation, for example when facing hazardous conditions such as crossing a street. During such manual operation, a remote operator can provide navigation instructions to the robot and direct it through the hazard, such as across the street. Once the robot has reached a safe environment, the operator can instruct the robot to resume autonomous navigation. The operator can further communicate with people in the immediate surroundings of the robot through the microphone and speakers that can be mounted on the robot. The robot can however continue to update its localization during manual control.

In another embodiment, the invention discloses an assembly of mobile robots comprising at least two mobile robots. The robots can be as described above. The robots can be adapted to communicate with each other via the communication module. The communication can be routed via the server. The data sent between the robots and/or between the robots and the server can be combined into a map of an operating area and/or of multiple operating areas. The coordinates used for each map data can be different, but they can each be converted into a standard coordinate system and/or combined in one unified arbitrary coordinate system. Multiple operating areas can correspond for example to different parts of a city. An operating area can comprise one hub and/or multiple hubs. The robots benefit from the map data gathered by the other robots via the map data exchange. The server can coordinate the exchange of map data. The server can further store map data and unify it into a global map. The server can send out map data to the robots based on their operating area. The map data can further be updated by the robots if the visual images taken by the cameras demonstrate a consistent change in the extracted features. For example, if new construction work is taking place within an operating area, the map of this operating area can be updated correspondingly.

In some preferred embodiments, the method can comprise a plurality of optimization algorithms. That is, the overall goal of the method can be to generate map data which can comprise landmarks with their location determined by the lines extracted from camera images. Therefore, the overall goal can be to find as many landmarks as possible with the best possible precision. At each step of the process, the best map can be found. This map can be the best given the step's assumptions on which lines correspond to landmarks and which should be removed. Therefore, the best map can be found repeatedly, each time making new associations and removing bad associations, as the map can improve with every step, provided the algorithm is functioning correctly. In this way, finding the best map can be part of an iterative algorithm which repeats at each step of an overlying iterative algorithm that has as a goal the maximisation of the landmarks located on the map.

In some embodiments, the presently described method and/or device and/or assembly can be directed to a vehicle, a car and/or a self-driving car. That is, the mapping method can be used by a self-driving car to build map data, and/or to navigate and/or to perform SLAM.

However, in other embodiments, the device and/or the assembly described herein, that is, the mobile robot and/or the assembly of mobile robots are substantially different from a car and/or a self-driving car. That is, in such embodiments, the mobile robot is significantly smaller than a car. In such embodiments, typical dimensions of the robot may be as follows. Width: 20 to 100 cm, preferably 40 to 70 cm, such as about 55 cm. Height: 20 to 100 cm, preferably 40 to 70 cm, such as about 60 cm. Length: 30 to 120 cm, preferably 50 to 80 cm, such as about 65 cm. In such embodiments, the mobile robot is also sufficiently lighter than a car and/or a self-driving car. In such embodiments, the weight of the robot may be in the range of 2 to 50 kg, preferably in 5 to 40 kg, more preferably 7 to 25 kg, such as 10 to 20 kg. In such embodiments, the robot can also be adapted to operate on the sidewalks unlike a car and/or a self-driving car. It can further have a velocity of no more than 20 km/h, such as no more than 10 km/h, preferably between 4 and 6 km/h.

That is, embodiments where the present invention can be applied to cars and/or self-driving cars are substantially different from embodiments where it can be applied to smaller, and/or lighter, and/or slower mobile robots.

It is known in the art that self-driving cars can use a plurality of sensors to autonomously navigate on public roads. Often, self-driving cars use Lidar sensors as a primary or one of the primary means of localization. The current invention presents a cost, space and equipment efficient way to localize a mobile robot with a precision of a few centimetres. The current invention can be applied to self-driving cars, however, the technology presently used for self-driving cars can be cumbersome and impractical to use on a mobile delivery robot operating on sidewalks.

The above features along with additional details of the invention, are described further in the examples below, which are intended to further illustrate the invention but are not intended to limit its scope in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

Figure 1:
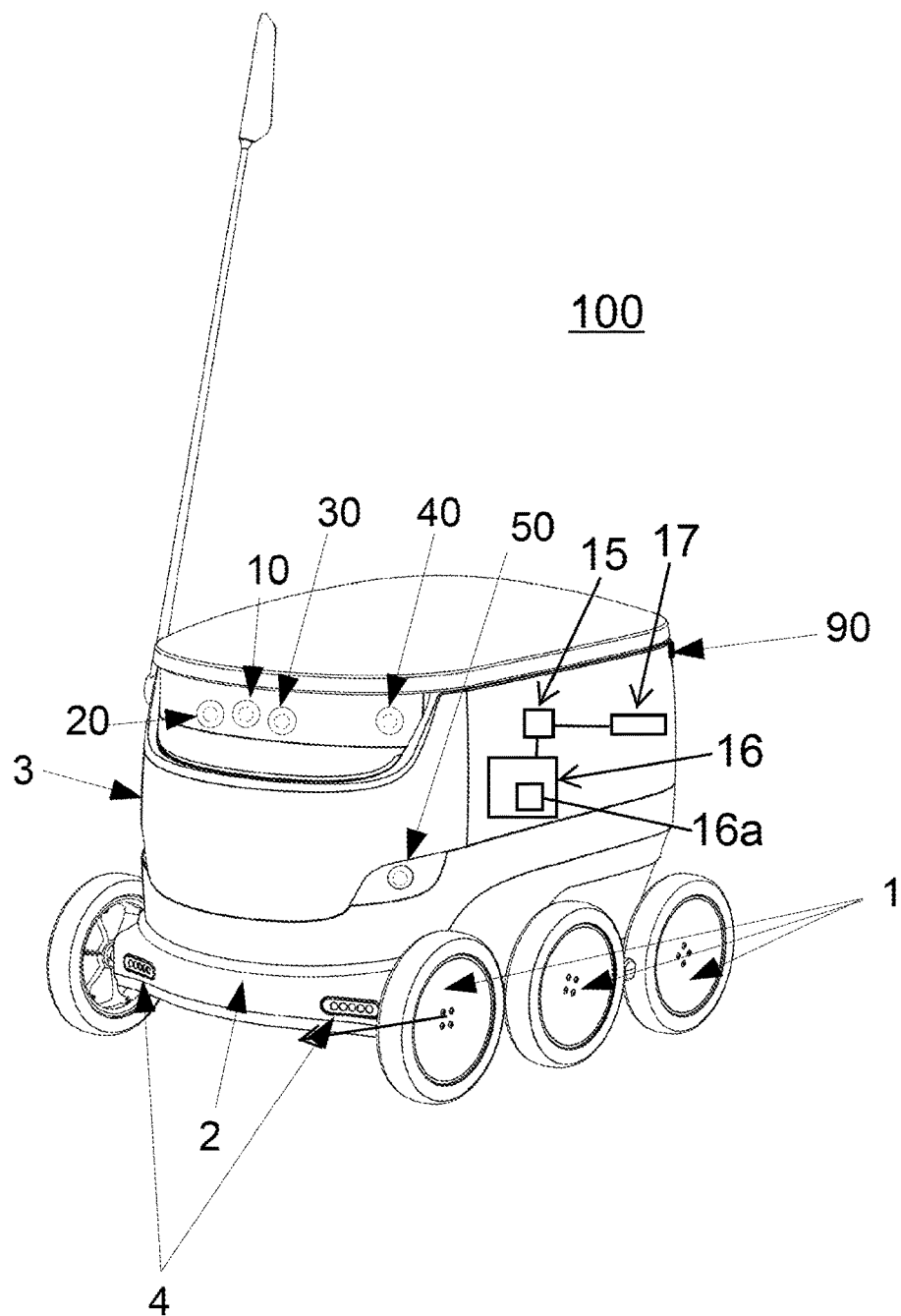
FIG. 1 shows a perspective view onto a robot embodiment in accordance with the present invention.

FIG. 1 shows an embodiment of the robot 100 according to the invention. The robot comprises wheels 1 adapted for land-based motion. Frame 2 can be mounted on the wheels 1. Body 3 can be mounted on the frame 2. A processing component 15, a memory component 16 and a communication component 17 can be mounted on the frame 2 and/or on the body 3 of the robot 100. The memory component 16 stores data and instructions, including instructions implementing an iterative algorithm 16a that resides in the memory component. Body 3 can comprise an enclosed space (not shown) adapted to transport a delivery. Lights 4 can be placed around body 3 and/or frame 2. Lights 4 can for example be LED lights and can illuminate the environment in which the robot finds itself. This can be useful to indicate the presence of the robot in the dark and/or assist visual localization through better illumination. A plurality of cameras can be placed around body 3. In this embodiment, 9 (nine) cameras are present.

A first camera 10 can be positioned near the front of the robot on the body 3. The first camera can provide an approximately horizontal view away from the robot. A second camera 20 and a third camera 30 are positioned on the two sides of the first camera 10 similarly near the front of the robot.

Second camera 20 and third camera 30 can be angled 10-50° downwards, preferably 20-40° downwards with respect to the first camera's 10 orientation, i.e. they can be angled downwards with respect to a horizontal view. Second camera 20 and third camera 30 can be stereo cameras. They can be separated by a distance of 5-10 cm. The stereo cameras facilitate triangulation of objects by comparing the features present on the visual images from the stereo cameras.

A fourth camera 40 and a fifth camera 50 are placed on the left side of the robot's body 3 with respect to a forward direction of motion. The fourth camera 40 and the fifth camera 50 can also be stereo cameras. They can be separated by a distance of 15-20 cm.

On the right side of the robot's body with respect to the direction of motion, a sixth camera (not shown) and a seventh camera (not shown) are placed in a position that is complementary to positions of cameras 40 and 50. The sixth camera and the seventh camera can also be stereo cameras preferably separated by a distance of 15-20 cm.

On the back of the robot, an eighth camera (not shown) and a ninth camera 90 can be placed. The eighth camera and the ninth camera 90 can also be stereo cameras preferably separated by a distance of 5-10 cm. One or more cameras can be arranged in a portrait orientation. This means that the vertical viewing angle can be larger than the horizontal one. In the shown embodiment, the further through seventh side cameras can be placed in a portrait orientation. The other cameras (first through third and eighth and ninth) can be placed in a landscape orientation. This means that the horizontal viewing angle can be larger than the vertical one.

Figure 2:
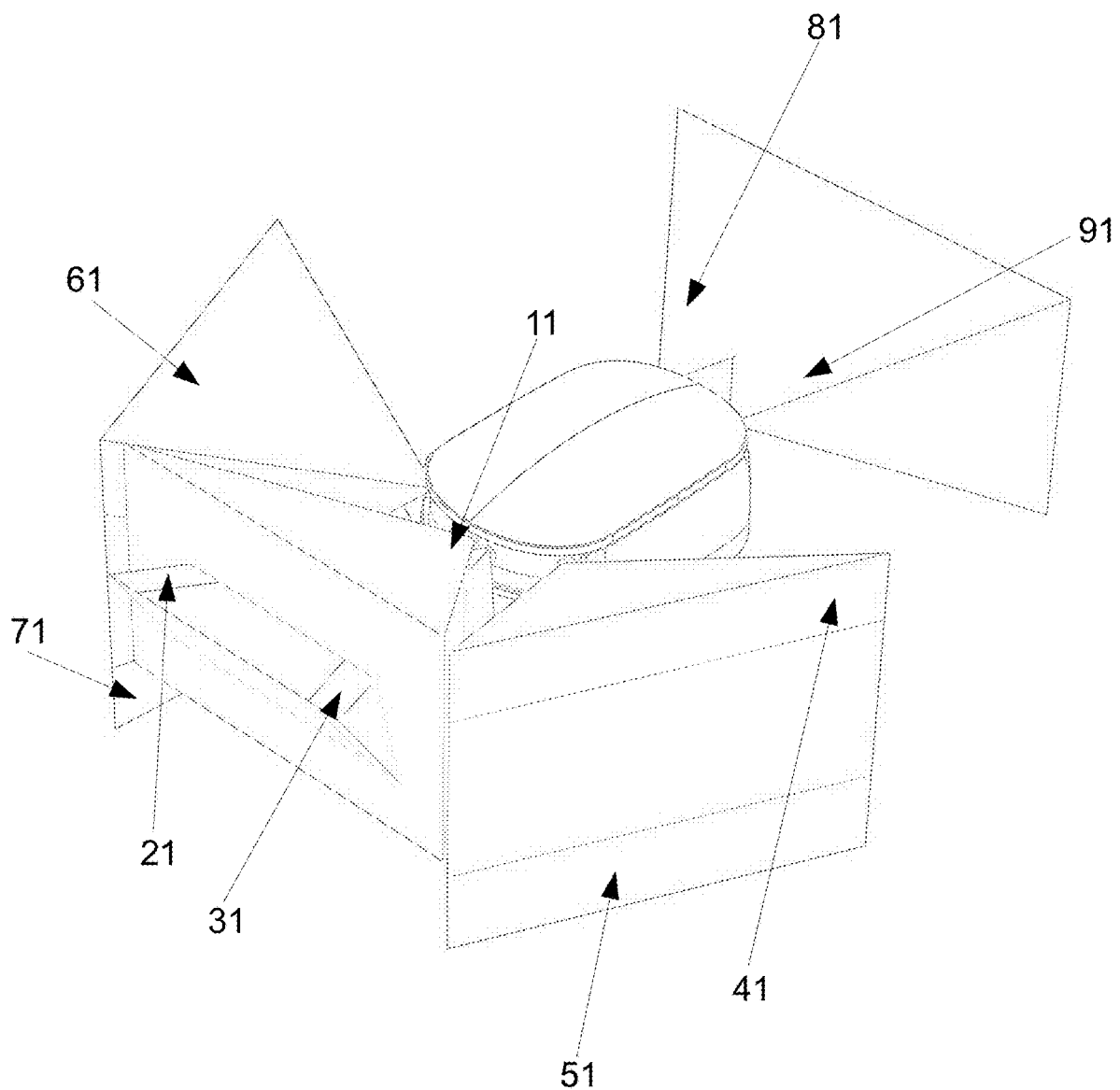
FIG. 2 shows an embodiment of different camera viewing angles.

FIG. 2 shows an embodiment of the robot according to the invention. FIG. 2 demonstrates viewing angles of a camera setup as shown in FIG. 1. All of the cameras' viewing angles are shown. The viewing angles can be in the range of 40-80° by 60-100°, preferably about 60° by 80°. The viewing angle 11 corresponds to the first camera 10. The viewing angles 21 and 31 correspond to the cameras 20 and 30 respectively. Those two cameras can be arranged in a stereo manner, which is why FIG. 2 demonstrates the viewing angles intersecting. A similar arrangement can be achieved with the eighth and ninth cameras—these can also be stereo cameras placed towards the back of the robot on its body 3. Therefore, viewing angles 81 and 91 corresponding to the eighth and ninth cameras, respectively, are also shown as intersecting. The two pairs of side cameras—one pair being the fourth and fifth cameras 40, 50 and the second pair being the sixth and seventh cameras (not shown) can be placed in a stereo position in a portrait orientation. Their corresponding viewing angles 41 and 51, and 61 and 71 respectively similarly intersect. The robot has cameras mounted thereon which point in different directions and whose viewing angles do not intersect, i.e., their fields of view are non-overlapping. For example, cameras 20 and 90 point in opposite directions (one forward and one rearward) and have non-overlapping fields of view.

Figure 3:
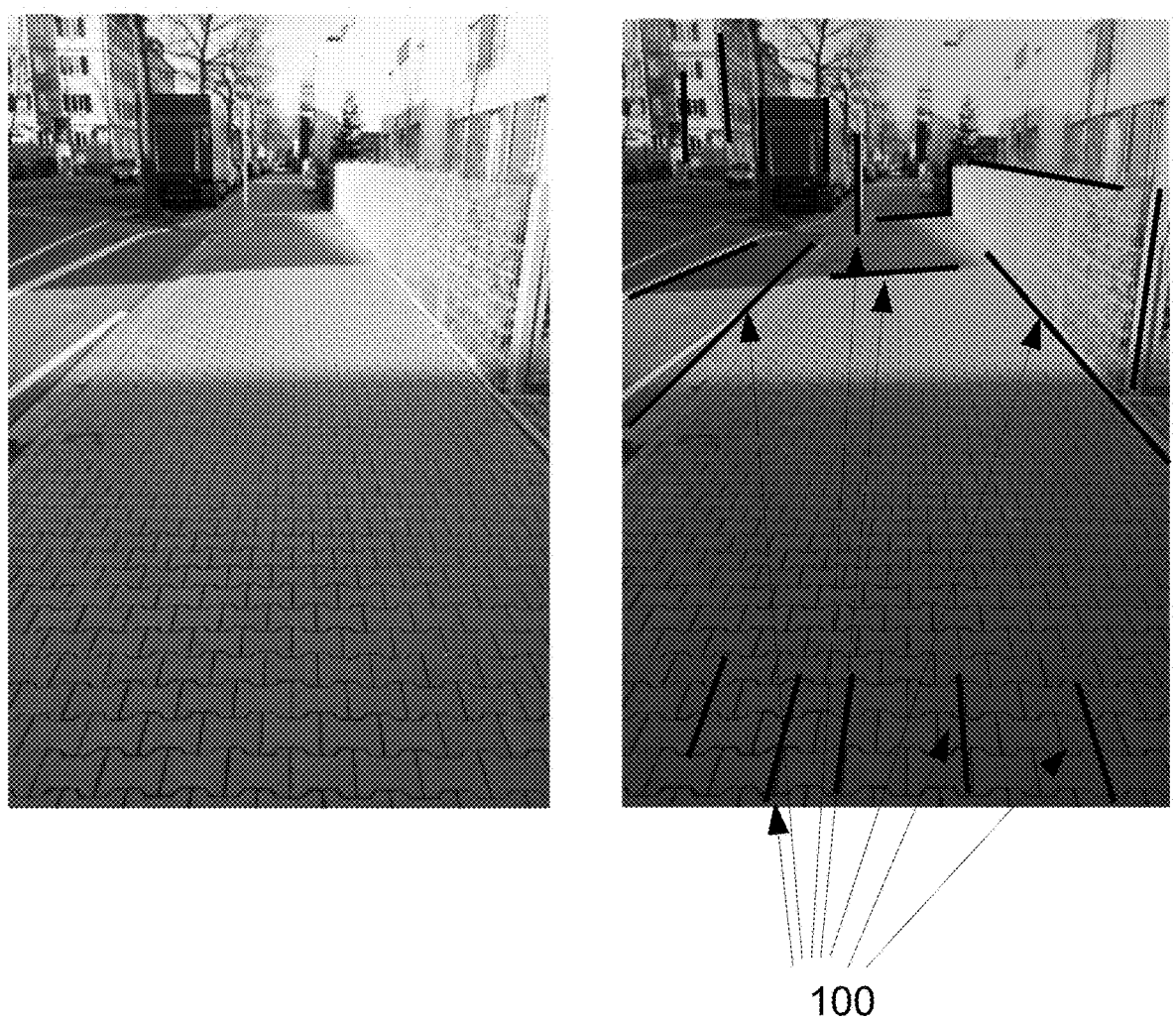
FIG. 3 shows an embodiment of straight lines extracted from an exemplary image using the described invention.

FIG. 3 shows an embodiment of straight lines 100 that can be extracted during the operation of the robot. Straight lines 100 can belong to permanent objects (such as houses, fences, sidewalks) and/or transitory objects (such as cars, shadows). The invention is adapted to be calibrated using multiple test cases of the images—improving its accuracy in detecting the lines and identifying the lines belonging to permanent objects. The extracted straight lines thus correspond to contours of permanent (non-transitory) physical objects in the images.

Figure 4:
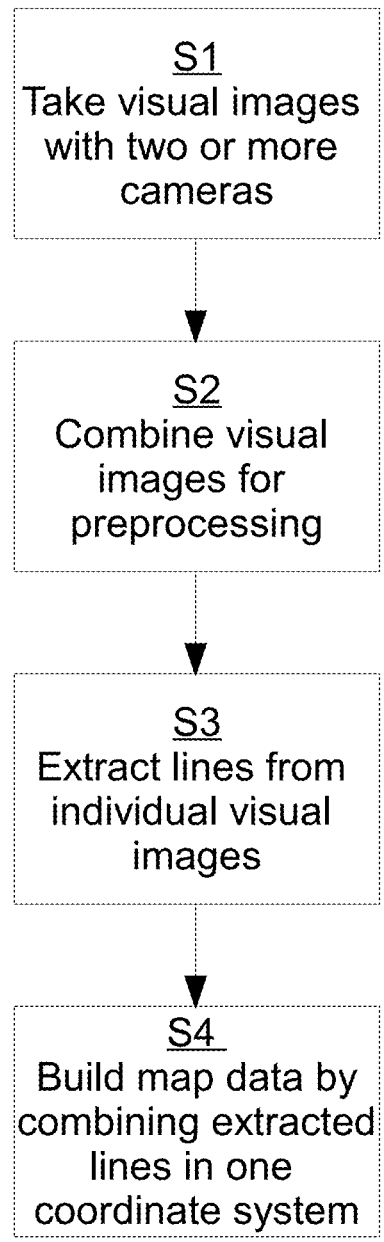
FIG. 4 shows a schematic description of an embodiment of a mapping method.

FIG. 4 shows an embodiment of a mapping method according to the invention. The first step S1 comprises taking visual images with the cameras placed on the robot. The visual images can be taken simultaneously. In a preferred embodiment, the robot comprises 9 (nine) cameras taking simultaneous images. The second step S2 comprises combining the visual images into one file for preprocessing. This step can be done to speed up the process. After the preprocessing, the combined file can be separated into the individual images again. The third step S3 comprises extracting lines from the individual images. This step can be done using first an edge detecting algorithm such as for example the Canny algorithm and then using a line extracting algorithm on the result of the edge detecting algorithm. The line extracting algorithm can for example be the Hough transform. The fourth step S4 comprises combining the extracted lines to build map data of the area the visual images were taken in.

The precise positions of the cameras on the robot and with respect to each other can be known, which enables combining the extracted lines in a coherent manner in one coordinate system. This coordinate system can be arbitrary, as long as it is consistent and can be converted into a standard system such as GPS coordinates. The method comprising steps S1, S2, S3, and S4 can be repeated every time a new set of visual images is taken by the cameras. In a preferred embodiment, this is repeated 1-10 times per second. The robot can thus build a consistent map data of its area of operation. If multiple robots are operating in one area of operation, they can exchange map data and update it when changes are detected. The robots can thus benefit from the map data taken by other robots. Map data of different operating areas can be combined into global map data comprising all of the operating areas of the robots.

Figure 5:
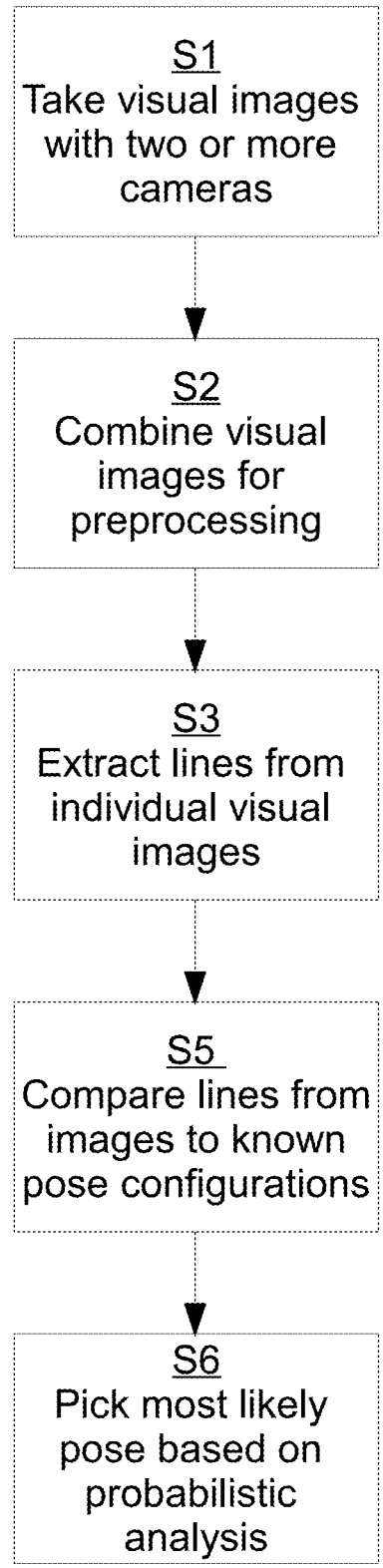
FIG. 5 shows a schematic description of an embodiment of a localization method.

FIG. 5 shows an embodiment of a localization method according to the invention. Steps S1, S2, and S3 can be the same as in the mapping method of FIG. 4. The localization method can be used when the robot comprises map data stored within its memory component. The fifth step S5 comprises comparing the straight lines extracted from the visual images (e.g., the aforementioned solid lines 120) to map data stored within the robot's memory component (e.g., the dotted lines 110). The map data stored within the memory component corresponds to different pose possibilities of the robot. The robot can then use a particle filter algorithm to evaluate the likelihood of each pose being the true one. In the sixth step S6 the most likely pose is picked based on the probabilistic analysis of known pose possibilities. This most likely pose will provide localization of the robot at the time the images are taken. The localization is rapid, and is typically complete within a very short timeframe, or at least before the next sets of images are processed (which can occur every 0.1 to 1 second).

If, for some reason, the robot is transiently unable to perform image-based localization, for example if the robot is unable to access or download a map to memory for performing localization during transit, the robot can navigate using other means of localizing that are also implemented on the robot (e.g., one or more of GPS coordinates, accelerometer data, gyroscope data, odometer data, time of flight camera data, magnetometer data and/or at Lidar data. Once the robot is able to resume image-based localization, its course can be readjusted if necessary, based on the more accurate localization data, taking into account its intended route of navigation.

Figure 6:
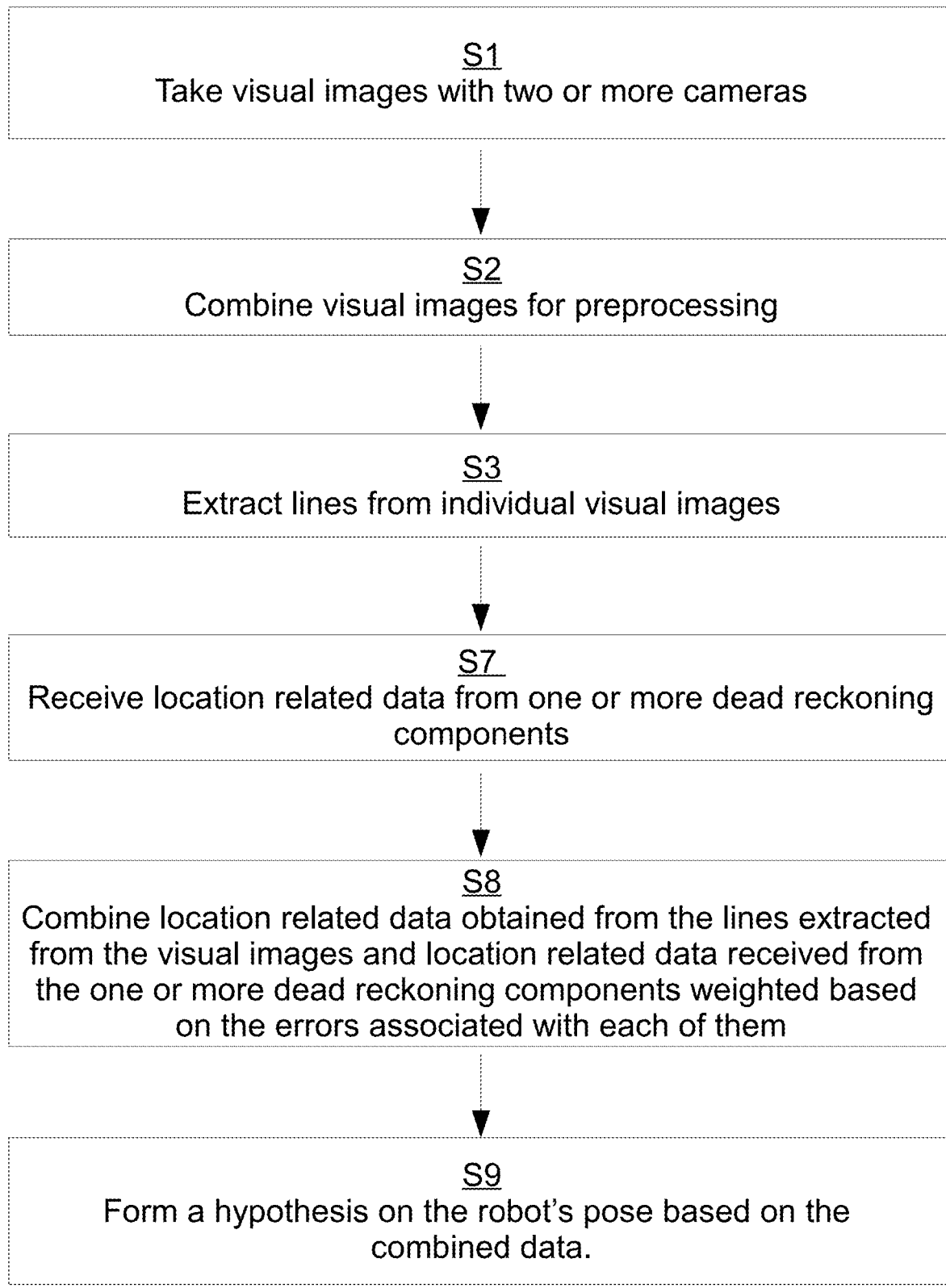
FIG. 6 shows an embodiment of a localization method according to the invention.

FIG. 6 shows an embodiment of a localization method according to the invention. Steps S1, S2, and S3 can be the same as in the mapping method of FIG. 4 and in the localization method of FIG. 5. The localization method can be used when the robot comprises map data stored within its memory component.

The seventh step S7 can comprise receiving location related data from one or more dead reckoning components.

Those can comprise at least one odometer, at least one accelerometer, and/or at least one gyroscope. The eighth step S8 can comprise combining location related data obtained from the lines extracted from the visual images and location related data received from the one or more dead reckoning components weighted based on the errors associated with each of them. The ninth step S9 can comprise forming a hypothesis on the robot's pose based on the combined data. The last two steps can be performed using for example a particle filter algorithm as described above and below.

In one embodiment, the robot can receive location data each time step from the dead reckoning component. This location data can comprise an error estimate associated with it. Optimal time step duration can be determined by calibration. In a preferred embodiment, a time step can comprise 0.01-0.1 seconds, more preferably 0.01-0.05 seconds. The location data can be taken as a starting point for robot pose estimation at each time step. The dead reckoning component can comprise at least one odometer and/or at least one gyroscope. The dead reckoning component can then be a control sensor as described in the particle filter description.

The robot can further take visual images using at least two cameras. The robot's processing component can then extract features from the visual images. In a preferred embodiment, straight lines are extracted from the visual images and comprise location related data. The lines seen on a given image and/or a given combination of images can be compared with the lines that should be seen (based on the map) based on the given particle's pose. Quantitatively this can be represented as a probability of seeing the particular lines given the particle pose. This probability can be calculated approximately by a fitness function. It can be applied to the particle weights as described before. Normalization can be done to reduce correlations within a camera frame—one camera receiving many lines (like for example from a picket fence) should not dominate over another camera input that received only a few lines (that for example only saw a couple of building corners). This is furthermore done to keep the error estimate within a reasonable range (for numerical stability). In one embodiment, the fitness function does approximately the following: associating a line from a camera image with a line on the map, calculating the error between the two, summing up all the errors (for example using the square summed method), normalizing the sums across all of the images taken at a point in time, adding them up, and finally taking an exponential of the negative sum.

The processing component can then combine the data from the dead reckoning component and from the line based localization along with their respective errors to obtain an estimation of the possible robot poses. This can be done using the particle filter method. During this step, input from further sensors and/or components can be considered. For example, the robot can consider the location or pose related data yielded by a GPS component, a magnetometer, a time of flight camera, and/or an accelerometer.

At each time step, the robot can update the weight of all the particles within the particle filter and ends up with a distribution of likely robot poses. A resampling step can be done when a certain criterion is reached to make sure that the particle filter does not fail.

Figure 7:
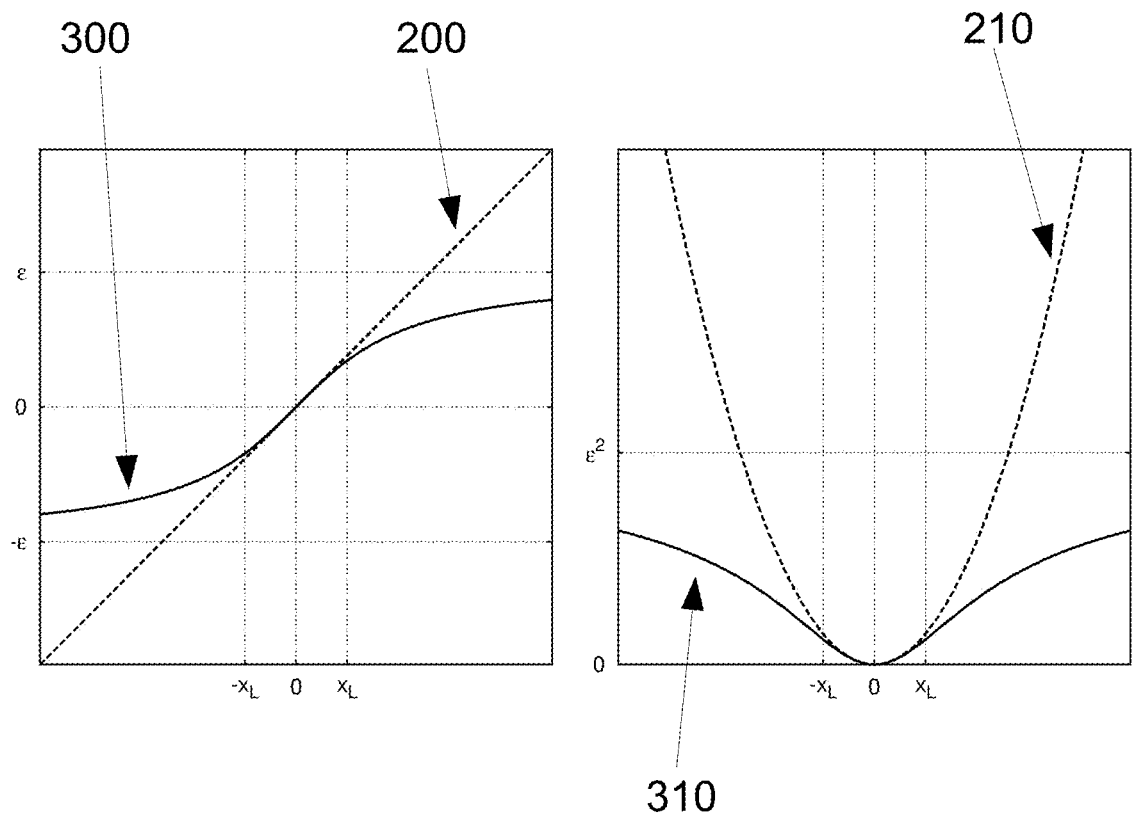
FIG. 7 shows an embodiment of the error capping function according to one embodiment of a mapping method.

FIG. 7 shows an embodiment of the error capping function according to one embodiment of a mapping method. As discussed above, the robot can comprise various sensors including the cameras, and, potentially including at least one but not limited to the GPS module, the odometry sensors, the accelerometers, the magnetometers, the ultrasonic sensors, the Time of Flight cameras, and/or the altitude sensors. Those sensors yield measurements with an associated error. Some of these errors can be systematic, as described above, resulting in values far outside the normal range of the sensors. This can lead to problems with building the map, as the map may end up distorted, so it cannot be used for navigation, and/or it may end up with too few landmarks and/or the iterative algorithm and/or algorithms can fail. Additionally or alternatively, when associated lines extracted from camera images, the associations can fail in such a way that the value is also outside the reasonable range. Therefore, an error capping mechanism can be used to avoid failure of the algorithm due to too large errors. In one embodiment, an error capping function $\alpha(x)$ can be introduced. The left part of FIG. 7 shows one possible embodiment of the error function 300, the arctangent. The variable of the function, that is the error, x is depicted by the line 200. Around the origin, the variable 200 and the error capping function 300 are very close to each other, that is, they practically coincide. However, after the variable x 200 exceeds a certain value $x_L$, it continues growing linearly, while the error capping function 300 converges to a constant value. This constant value is denoted as E in the figure. The range of linearity $x_L$ and the maximum error value E can be adjusted as needed for a sensible capping of errors. Note, that the arctangent is only one possible function to be used as the error capping function 300. Other functions that behave in a similar way can be used. That is, other functions that approximately coincide with the variable around the origin and converge to a certain finite value after some time can be used. Preferably, the error capping function 300 is differentiable. Preferably, its first derivative is continuous. Preferably, the function 300 is strictly monotonic, that is, increases with increasing variable 200.

The right part of FIG. 7 shows the square of the variable x 210 and the square of the error capping function $\alpha(x)$ 310. Around the origin, the two still almost coincide, and as the parabola $x^2$ 210 diverges, the square of the error capping function (in this case the square of the arctangent) $\alpha(x)^2$ converges to $E^2$.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A mobile robot mapping method for generating a map, comprising:
    (a) providing a mobile robot configured to navigate outdoors on a sidewalk to deliver an item, the mobile robot having a body and a space for holding the item while in transit, the mobile robot further comprising at least two cameras mounted on the body which point in different directions and have non-overlapping fields of view, and at least one processing component;
    (b) operating the mobile robot in an outdoor operating area;
    (c) taking visual images with the at least two cameras;
    (d) extracting at least straight lines from the visual images with at least one processing component, the extracted straight lines corresponding to contours of permanent physical objects in the visual images; and
    (e) generating map data using at least the extracted straight lines from the visual images; wherein:
    step (d) comprises:
        detecting that a certain number of lines all belong to the same physical object and merging them into one line; and
        detecting that a certain line is likely to belong to a transitory physical object and not assigning that line to a physical object.

2. The mobile robot method according to claim 1, further comprising combining the visual images and/or the extracted straight lines in a single reference frame based on the relative placement of the two cameras.

3. The mobile robot method according to claim 1, further comprising:
    extracting location-related data from one or more sensors adapted to measure further parameters for building map data, said one or more sensors being from the group consisting of a GPS component, an accelerometer, a gyroscope, an odometer, a magnetometer, a pressure sensor, an ultrasonic sensor, a time of flight camera sensor, and a Lidar sensor; and
    combining this location-related data with data from the visual images to build map data.

4. The mobile robot method according to claim 1, wherein, in step (e) generating map data comprises using an iterative algorithm to at least associate the extracted straight lines with physical objects.

5. The mobile robot method according to claim 4, wherein the iterative algorithm comprises an optimization routine optimizing at least one robot pose and the position of the physical objects based on the extracted straight lines.

6. The mobile robot method according to claim 4, wherein the iterative algorithm comprises at least combining lines belonging to the same physical object from images taken by different cameras and/or discarding lines belonging to transient objects and/or light or camera effects.

7. The mobile robot method according to claim 1, further comprising capping errors associated with the robot's sensors.

8. The mobile robot method according to claim 7, comprising capping errors associated with systematic sensor errors and/or invalid physical object associations of the extracted straight lines from the visual images.

9. The mobile robot method according to claim 1, wherein:
    the mobile robot is an autonomous and/or semi-autonomous mobile robot; and
    the method performs simultaneous mapping and localization (SLAM).

10. The mobile robot method of claim 1, comprising:
    operating the mobile robot in an outdoor operating area at a speed of no more than 10 km/h.

11. A mobile robot configured to navigate outdoors on a sidewalk and deliver an item, the mobile robot having a body and a space for holding the item while in transit, the robot comprising:
    at least two cameras mounted on the body and adapted to take visual images of an operating area, the at least two cameras pointing in different directions and having non-overlapping fields of view;
    at least one processing component adapted to extract straight lines from the visual images taken by the at least two cameras and generate map data based at least partially on straight lines corresponding to contours of permanent physical objects in the images; and
    a communication component adapted to send and receive image and/or map data;
    wherein:
    the at least one processing component is configured to:
        detect that a certain number of lines all belong to the same physical object and merge them into one line; and
        detect that a certain line is likely to belong to a transitory physical object and not assign that line to a physical object.

12. The mobile robot according to claim 11, wherein:
    each camera is adapted to capture 3 to 5 images per second.

13. The mobile robot according to claim 11, comprising:
    at least 4 pairs of stereo cameras, members of each pair of stereo cameras located on the mobile robot so as have overlapping fields of view and provide depth information.

14. The mobile robot according claim 11, wherein the map data comprises:
    one or more of vectors, point features and grid features associated with physical objects, and defined with respect to a coordinate system, and/or
    error estimates for one or more of vectors, point features and grid features associated with said physical objects.

15. The mobile robot according to claim 11, wherein the map data comprises visibility information related to locations from which physical objects can and/or cannot be seen.

16. The mobile robot according to claim 11, wherein:
    the communication component is adapted to send map data and/or image data to a server which is configured to refine existing map data using the map data and/or image data sent by the robot's communication component.

17. The mobile robot according to claim 16, configured to navigate using the refined map data received from the server.

18. The mobile robot according to claim 11, further comprising:
one or more sensors adapted to measure further parameters for building map data, said one or more sensors being from the group consisting of a GPS component, an accelerometer, a gyroscope, an odometer, a magnetometer, a pressure sensor, an ultrasonic sensor, a time of flight camera sensor, and a Lidar sensor.

19. The mobile robot according to claim 11, wherein the robot is autonomous and/or semi-autonomous.

20. The mobile robot according to claim 11, wherein:
the robot is adapted to travel with a speed of no more than 10 km/h.

21. The mobile robot according to claim 11, comprising a first pair of stereo cameras mounted on a front of the body, second and third pairs of stereo cameras mounted on opposite sides of the body and a fourth pair of stereo cameras mounted on a back of the body.

22. The mobile robot according to claim 11, comprising an enclosed space within the body for holding an item to be delivered to a predetermined delivery location.

23. The mobile robot according to claim 22, wherein:
the at least one processing component is adapted to generate said map data, while the mobile robot is in transit to said predetermined delivery location.

24. The mobile robot according to claim 11, wherein:
the at least one processing component is configured to generate map data using an iterative algorithm.

25. A mapping system comprising:
at least two mobile robots, each mobile robot configured to navigate outdoors on a sidewalk and deliver an item, the mobile robot having a body and a space for holding the item while in transit, each mobile robot comprising:
at least two cameras mounted on the body and adapted to take visual images of an operating area, the at least two cameras pointing in different directions and having non-overlapping fields of view;
at least one processing component adapted to extract straight lines from the visual images taken by the at least two cameras and generate map data based at least partially on straight lines corresponding to contours of permanent physical objects in the images; and
a communication component adapted to send and receive image and/or map data;
wherein:
the at least one processing component is configured to:
detect that a certain number of lines all belong to the same physical object and merge them into one line; and
detect that a certain line is likely to belong to a transitory physical object and not assign that line to a physical object wherein:
the communication component of each robot is adapted to send and receive image data and/or map data to the other of the at least two robots.

26. The mapping system according to claim 25, wherein:
the data sent between the robots is combinable into a map of multiple operating areas.

27. The mapping system according to claim 25, further comprising a server adapted to:
communicate with the robots via their communication component;
receive map data and/or image data from a first robot;
process the map data; and
send the processed map data to a second robot, in response to a request from the second robot.

28. The mapping system according to claim 27, wherein the server is adapted to:
receive image and/or map data from the at least two robots; and
further process these data to generate at least further map data.

* * * * *